US012204654B1

(12) United States Patent
Soylemezoglu et al.

(10) Patent No.: US 12,204,654 B1
(45) Date of Patent: Jan. 21, 2025

(54) SYSTEMS, DEVICES, AND/OR METHODS FOR THIRD PARTY VERIFICATION OF DATE, TIME, TELEMETRY, AND LOCATION OF DIGITAL INFORMATION WITH VERIFIABLE CUSTODIAL SERVICES

(71) Applicants: Ahmet Irfan Soylemezoglu, Cambridge, MA (US); Hurriyet Aydin Ok, McLean, VA (US)

(72) Inventors: Ahmet Irfan Soylemezoglu, Cambridge, MA (US); Hurriyet Aydin Ok, McLean, VA (US)

(73) Assignees: Ahmet Irfan Söylemezolu, Cambridge, MA (US); Hürriyet Aydin Ok, McLean, VA (US)

( * ) Notice: Subject to any disclaimer, the term of this patent is extended or adjusted under 35 U.S.C. 154(b) by 232 days.

(21) Appl. No.: 17/942,293

(22) Filed: Sep. 12, 2022

(51) Int. Cl.
*G06F 21/57* (2013.01)

(52) U.S. Cl.
CPC .................. *G06F 21/577* (2013.01)

(58) Field of Classification Search
CPC ..................................................... G06F 21/577
USPC ............................................................ 726/25
See application file for complete search history.

(56) References Cited

U.S. PATENT DOCUMENTS

| | | | |
|---|---|---|---|
| 2018/0018468 A1* | 1/2018 | Williams | G06F 21/64 |
| 2020/0092439 A1* | 3/2020 | Yoshioka | H04N 1/32112 |
| 2021/0021423 A1* | 1/2021 | Latorre | G06Q 10/10 |
| 2022/0100906 A1* | 3/2022 | Nagaraja | G06F 21/57 |

\* cited by examiner

*Primary Examiner* — Lan Dai T Truong
(74) *Attorney, Agent, or Firm* — Faegre Drinker Biddle & Reath LLP

(57) ABSTRACT

Certain exemplary embodiments can provide a method comprising receiving a request to apply a DTL Seal to a file. The method further comprises inserting the DTL Seal in the File. The method further comprises storing a first copy of the File comprising the DTL seal to an information device of a user. The method further comprises storing a second copy of the File comprising the DTL seal to a custodial memory device.

7 Claims, 3 Drawing Sheets

2000

SYSTEMS, DEVICES, AND/OR METHODS FOR THIRD PARTY VERIFICATION OF DATE, TIME, TELEMETRY, AND LOCATION OF DIGITAL INFORMATION WITH VERIFIABLE CUSTODIAL SERVICES

BRIEF DESCRIPTION OF THE DRAWINGS

A wide variety of potential practical and useful embodiments will be more readily understood through the following detailed description of certain exemplary embodiments concerning the accompanying illustrative drawings in which.

DETAILED DESCRIPTION

Figure 1:
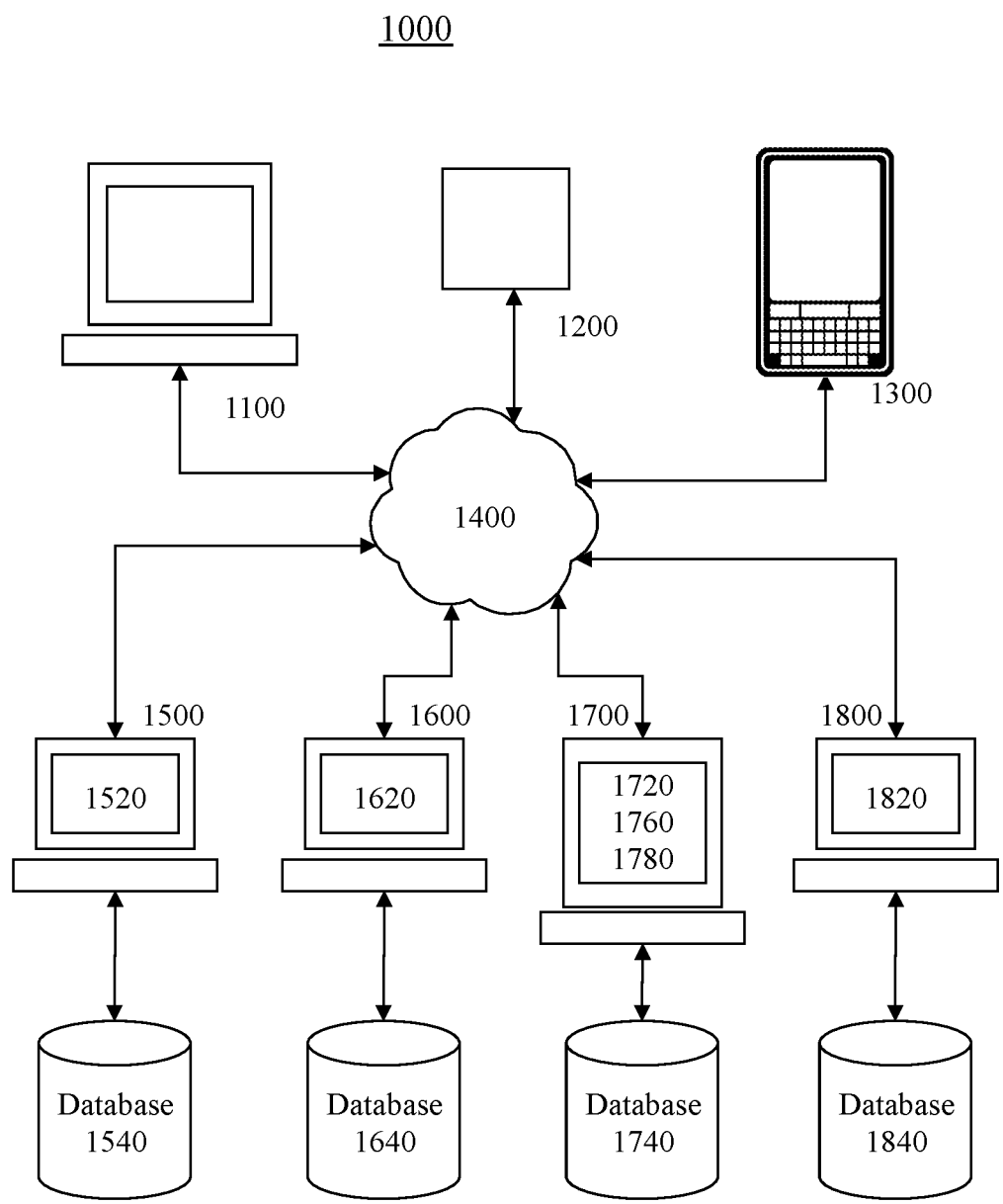
FIG. 1 is a block diagram of an exemplary embodiment of a system 1000.

Certain exemplary embodiments can provide a method comprising receiving a request to apply a Date Time Location Seal (also referred to from now on as a "DTL-Seal" or a "DTL-S") to a file (the "File"). The method further comprises inserting the DTL-Seal in the File. The method further comprises storing a first copy of the File containing the DTL-Seal to an information device of a user. The method further comprises storing a second copy of the DTL-Seal File in a custodial memory device. The method further comprises sending images with DTL-Seal to any person, legal or natural, upon the request of the owners/operators of the device that the image(s) was (were) taken.

Certain exemplary embodiments provide a mobile application (from now on, "DTL-S Application," the "Application," or the "App") to function as a third-party certifier of data files. For example, the App can embed a DTL-S to capture pictures and/or videos of mobile device owners/operators. As another example, the App can embed a DTL-S to electrocardiogram information, which can be captured by a wearable device delivered to a mobile device. As another example, the App can embed a DTL-S to magnetic resonance imaging information, which a scanner can capture. In certain exemplary embodiments, files can be embedded with exact dates, times, and location attributes and/or provide custodial services for the captured photos, voice recordings, Application-oriented telemetry data, and/or videos. The inventors have named the App "Momentproof." The App improves the functionality of information devices via which it is utilized and produces electronic files that are not capable of being produced without the unique functionality of the App.

In certain exemplary embodiments, the App functions as a third-party certifier of one or more files of a mobile device. Owners and/or operators of the mobile device are provided with an exact date, time, and location attribute. Certain exemplary embodiments provide custodial services for data files (e.g., captured photos and/or videos, three-dimensional ("3D") Objects and 3D volumetric data used by Augmented Reality ("AR"), Virtual Reality ("VR"), and Mixed Reality ("MR") applications, and/or medical files, etc.). Certain exemplary embodiments can apply DTL-S information on, for example, electrocardiogram data captured by a wearable device. Other embodiments can apply DTL-S information on medical imaging data obtained by a coupled medical imaging device, such as Magnetics Resonance Imager ("MRI") Machines and Computed Tomography ("CAT") Scanner.

The App is constructed to communicate with one or more trusted devices via an encrypted connection. In certain exemplary embodiments, a DTL-S is generated at a mobile device capable of generating and applying the DTL-S. The DTL-S can be shared without a secure connection in certain exemplary embodiments. In certain exemplary embodiments, to address privacy concerns, the mobile device and a central connection be via a secured (i.e., encrypted) connection. In certain exemplary embodiments, sensitive and/or confidential data can be encrypted prior to being transmitted. DTL-S sealing ensures the data in a file cannot be altered after the creation of the DTL-S. The App can comprise machine instructions and/or hardware that validate one or more trusted devices and detect any tampering with hardware and/or software involved in DTL-S insertion and/or verification.

In certain exemplary embodiments, a mobile device operating the App can be a mobile phone, tablet, information device, or computing device coupled to any functional unit. Functional units can comprise, but are not limited to, any sort of vehicle, military vehicle, and/or naval or air vehicle (including, without limitation, airplanes and/or drones, etc.).

The device is capable of obtaining accurate time stamp from an Internet connected trusted time source and can retain and update a "current timestamp" in case of intermittent disconnection from the trusted time source.

Each device has a unique device ID bound to the device's hardware. This unique ID is important in creating DTL-S. To preserve privacy, DTL-S publishes a hash of device ID and makes it publicly available as a part of DTL-S information. This device ID is hardware-based and embedded into the device's hardware during manufacturing. Most mobile phones, for instance, have a unique device ID. In cases where a device ID is not present, a software emulation can create a unique device ID and store this ID in software or another hardware-preserved storage ("Storage"), a secure area protected by modern processors—e.g., a trust zone of advanced RISC machine ("ARM") processors and similar applications by Intel and AMD's processor implementations or trusted platform module ("TPM"). Intel is a registered trademark of Advanced Micro Devices, Inc. of Santa Clara, CA. AMD is a registered trademark of Advanced Micro Devices, Inc. of Santa Clara, CA.

For virtual world applications, it is possible to create a virtual device ID or use an existing hardware device ID, depending on the Application. Certain exemplary embodiments utilize a single real device ID instead of creating a virtual device ID for the device. In embodiments where a virtual device ID is created, the virtual device ID can be cryptographically bound to the physical device ID to ensure future authenticity and avoid spoofing of the device ID. Certain AR/VR headsets are Android (Android is a registered trademark of Google Inc. of Mountain View, CA) based, so, it is reasonable to assume to use the hardware device ID, similar to mobile phones. Creating a virtual device ID for a virtual image capturing device (e.g., virtual camera or digital twin of an MRI machine) in a virtual world (the "Metaverse) is utilized in certain exemplary embodiments.

Before the device is accepted to a DTL-S trusted member set, the device's integrity concerning software and, if possible, hardware components are verified, ensuring the software and hardware components meet certain requirements: The verification comprises, but is not limited to, the existence of a particular software version, operating system patch, operating system version, exclusion of specific list of software not being installed on the device, and/or validation of critical hardware components or sensors that operate in a trustworthy manner. Validation processes comprise validating GPS sensors and/or connectivity to trusted time services. Validation processes can rely on attestation services and related protocols.

Certain exemplary embodiments utilize a precision global positioning system ("GPS") retrieval and maintenance capability comprised of many devices. Certain exemplary embodiments can obtain a precise location from a trusted GPS source. In cases the trusted GPS source is unavailable, the device can continuously calculate its GPS position from the last known place in case intermittent GPS trusted resource disconnection occurs. Such calculations can take advantage of other technologies embedded into the device, such as WI-FI, and cellular tower data can also help with the location information. When GPS is unavailable, location tracking can rely on neighboring Bluetooth devices, Wi-Fi data, cellular tower pings, quick response ("QR") codes and radio frequency identification ("RFID") technology.

The App can insert a DTL-S, which verifies the correct time according to GPS data. The App can directly access the GPS output of a trusted device. Thereby, the DTL-S cannot be tampered with by a user.

The image-capturing capability of mobile devices has become increasingly sophisticated. Users often use such mobile devices as a substitute for dedicated cameras and video recorders. In other words, these devices have become the only cameras and video-recorders users utilize. Those mobile devices also have telecommunication capabilities. Embodiment mentioned here as video, voice recording, and photo can be extended beyond mentioned formats and encompasses any information format as the applications extend, including but not limited to 3D file formats used by Augmented Reality, Virtual Reality, gaming applications, and more.

In virtual reality applications or other applications where state space variables change over time, a user might desire to have a DTL-S embedded in a file. For example, the user might wish to save or document progress in virtual reality or augmented reality experience. Such embodiments can utilize a Virtual DTL-S ("VDTL-S"). In virtual world embodiments, timestamp and location parameters can be taken from a virtual world trusted location server and a virtual world trusted time server. In Metaverse applications where Metaverse needs to be in sync with the real world, Virtual and real world time should always be the same and rely on the same trusted time servers.

The device can be a tablet, mobile phone, or an information device with hardware-based components (such hardware-based components are referred to hereinafter as "Secure Components"). Installing the DTL-S Application creates a unique DTL-S cryptographic device identity ("CDI"). The CDI is registered to a DTL-S trusted devices management system ("DTMS").

For the virtual world, it is possible to have virtual devices hosted on physical devices. The Secure Component can generate, index, and retain multiple private keys in such embodiments.

In virtual world applications, all global positioning system ("GPS") locations and trusted time resources are aligned with the virtual world or augmented reality facts. So GPS location trusted source and timestamp trusted source is relative to the virtual world in which the user and the device is participating. For such applications, a corresponding VDTL-S is generated using similar principles of the process via which a DTL-S is created for particular information. A system may concurrently calculate and publish one real DTL-S and one Virtual DTL-S for a given file in certain exemplary embodiments. In Metaverse, only one DTL-S is used as both Metaverse and real world overlaps.

In a virtual world, GPS locations and trusted time resources can be aligned with the virtual world or the augmented reality facts. So a GPS location trusted source and a timestamp trusted source is relative to the real and virtual environments in which the user and the device are participating. For such applications, a corresponding VDTL-S can be generated using the same principles of the way DTL-S is created for particular information. In some embodiments, the system may concurrently calculate and publish for the same information, one real DTL-S and one VDTL-S.

Certain exemplary embodiments provide devices, systems, and/or methods that independently certify some of the captured pictures and/or videos with an exact date, time, and location of the instance that the captured pictures and/or videos were taken. In certain exemplary embodiments, some or all of the certified captured pictures and/or videos can be copied and securely stored by a custodian on a custodial memory device.

Each device has or is assigned a unique device ID. Each device has a hardware-oriented (or processor-supported) Secure Component that has key Storage, has the ability to generate the asymmetric crypto private key and public keys, has the ability to store private key in a private key store, and have the ability to perform private key operations used in digital signing of entities that the corresponding public key can verify. The Secure Component can be a version of TPM and/or can be implemented as a part of the processor (ARM TrustZone, Intel's and AMD's special separate implementations in processor. TrustZone is a registered trademark of ARM Limited of Cambridge, UK. Note, ARM, Intel, and AMD are companies in the design (ARM) or manufacturing computer processors (Intel, AMD)]. In certain exemplary embodiments, the Secure Component does not share a memory or processor with a main host where applications run. Applications, via an interface, request the Application of a signature (aka encryption via private key) or decryption (a corresponding private key can decrypt encryption by a public key). The Secure Component comprises a cryptographic engine to perform private key operations, has the secure Storage ("Secure Storage") to store private key and, in some cases, additional Storage to store additional values the applications may desire to store and retrieve.

Asymmetric cryptography can be via a Rivest-Shamir-Adleman ("RSA") algorithm or Elliptic Curve Crypto ("ECC"). In asymmetric cryptography, each device via Secure Component, upon device initialization by DTL-S Application, creates new private and public key pair. The private key pair is stored in a secure store. The public key can be made available to the outside world, indicating the public key of the initialized device.

Certain exemplary embodiments utilize a collision resilient hash function to calculate a hash or a byte array. Certain exemplary embodiments use a SHA2 algorithm (which can have digests of 256, 512, 1024, or more if applicable in bit length). Other embodiments utilize alternative hash algorithms.

DTL-S can be inserted by the App, which verifies the correct time according to GPS data. The App can directly access the GPS output of a trusted device. Thereby, the DTL-S cannot be tampered with by a user.

The DTL-S Application receives date and time information from a reliable time service. In certain exemplary embodiments, reliable time service can be provided with precision by mobile service providers as well as via one or more Internet resources if a mobile device is coupled to the Internet. In certain exemplary embodiments, reliable time service can be provided via an open Wi-Fi service, etc.

A device that runs the DTL-S Application is a member of a service providing DTL-S (the "DTL-S Service") and validated as a trusted device.

A computing unit that is crypto operation capable and comprises local Storage provides secure Storage ("Secure Storage"). Secure Storage can operate separately from the host device to which the Secure Storage is coupled. Thus, the application space can be isolated from hardware-oriented components. In certain exemplary embodiments, the software cannot reach hardware-oriented components, such as Secure Storage, as there is an air gap between the hardware security components and the computer application space where the applications run. Such functionality can be implemented in the form of a combination of hardware and system-level software (e.g., on Android Devices or Apple devices). Apple is a registered trademark of Apple Inc. of Cupertino, VA. For example, TPM 1.2 can implement such functionality on new generation processors (AMD, RISC trust zone, Intel, etc.), which each have some capabilities in implementing such secure trusted hardware-software combinations. In certain exemplary embodiments, an asymmetric private key is generated at a hardware level, stored at the hardware level, and all private key operations are performed separately from the Memory and processor of the host where applications operate.

For DTL-S, Secure Components can be used for:
Asymmetric crypto operations involve the utilization of an asymmetric crypto private key.
Generating private and public keys utilized for asymmetric crypto operations and storing private keys in local Storage of Secure Components where the host software applications cannot directly access same.
Making a graphic device private key and a corresponding public key available.
Preferably, a device identifier ("ID") is retained in Secure Components or is part of the Hardware where Secure Components can access the actual value and report a hash of device ID.
Asymmetric crypto encryption (also known as signing) or asymmetric decryption using private key operations are performed at local Storage and local processing unit of one or more Secure Components.

DTL-S Header Members Corresponding to a File

| Field | Name | Description | Details |
|---|---|---|---|
| Pk | Device Public Key | Used for Validating a signature | Public Key of an Asymmetric Cryptographic Algorithm. RSA (Rivest-Shamir-Adleman) or ECC (Elliptic Curve Cryptography) or any future Asymmetric Cryptography Algorithm |
| HdID | Hash of Device ID | Ensures the device ID information is preserved and only its hash is used to ensure the original Device ID is not exposed. | See Hash Function (*) |
| CDI | Cryptographic Device Identity | CDI = Asymmetric-Encrypt (Private Key from the SECURE STORAGE, HdID) | |
| TS (V) | Timestamp | Timestamp is created by the device at the time the information (can be any file or block of Memory storing the captured information that will be Date-Time-Location Sealed). Obtained from Trusted Time Source | Some formats include but are not limited to: ISO 8601 Format or UTC (Universal Time Coordinated |
| L (V) | GPS (Global Positioning System) Location | Obtained from GPS Sensor built into the device | |
| UiD | User Identifier | Indicating a User of a device. It can be email bound to a mobile user account. Another option is to store the user's face ID, thumbprint ID, pattern ID, and the user ID combined | Can be logged on user or, in the case of mobile devices, which the user unlocked (authenticated to the device to start using the device). |
| Hinfo | Hash of Information (can be in Memory) or mostly of File the information is stored | Information can be any form of information interested in DTL-Seal: Can be video, photo, or any information relevant to the domain | |

-continued

| Field | Name | Description | Details |
|---|---|---|---|
| DTLS-Signature | DTL- S | Calculated by DTLS-Signature = Asymmetric-Encrypt (Private Key from the SECURE STORAGE, HASH(HDiD + TS + L + UiD + Hinfo)) | "+" implies concatenation of listed fields during the Hash calculation. See Hash Function (*) |

(*) Hash-Function: The Hash function is a hash algorithm resilient for collisions such as SHA2 and other algorithms (excluding deprecated algorithms like MD5 or SHA1).

DTL-S(Signature) Validation is as follows:
Using DTL-S header information, calculate the following Hash:

Hash-Validate=HASH(HDiD+TS+$L$+UiD+$H$info)

Decrypt DTLS-Signature using Public Key of DTL-S Header
   Decrypted-DTLS-Signature=Asymmetric Decrypt (Public Key from the DTL-S Header, DTLS-Signature)
   If Hash-Validate is EQUAL to Decrypted-DTLS-Signature, successful DTL-S Validation
CDI Validation is as follows:
Decrypt CDI using Public Key of DTL-S Header
   v=Asymmetric Decrypt (Public Key from the DTL-S Header, CDI)
If v is EQUAL to HdID, successful CDI Validation Stage 1
Ask SECURE STORAGE for Hash of Device ID, Secure-HdID, if Secure-HdID is equal to HdID, if Stage 1 validation is successful, and if CDI validation is successful.

More specifically, a file and DTL-S go hand in hand. The DTL-S ensures the file corresponding to the associated DTL-S is not tampered with and its creation at a given GPS location and time stamp is recorded without the chance of some third party ever being able to alter such information.

Certain exemplary embodiments provide devices, systems, and/or methods that independently certify some of the captured pictures and/or videos with an exact date, time and location of the instance that the captured pictures and/or videos were taken. In certain exemplary embodiments, some or all of the certified captured pictures and/or videos can be copied and securely stored by a custodian on a custodial memory device.

In certain exemplary embodiments, a trusted device can create the DTL-S. Certain exemplary embodiments might not utilize further validation. In other embodiments, a user device can create the DTL-S. The DTL-S can be examined and certified or re-certified in certain exemplary embodiments.

Certain exemplary embodiments can:
   verify that a device's DTL-S capturing capabilities are functioning perfectly and were not tampered with; and/or
   check time and location data from a GPS.
The App is constructed to:
independently verify the date, time, and location (DTL) of captured pictures and/or videos by mobile devices (e.g., phones and tablets);
insert a DTL Seal in each of the captured pictures and/or videos requested for certification from the App;
forward to the user or a specified counterparty certified captured pictures and/or videos that have had a DTL Seal inserted;
store as a custodian of certified captured pictures and/or videos on custodial servers for the entire duration of a predetermined storage time period; and
transmit certified captured pictures and/or videos that have had a DTL Seal inserted to user specified counterparties during the predetermined storage time period.

Hence, the App acts to certify the date, time, and location of captured pictures and/or videos and transmit a copy of certified captured pictures and/or videos that have had a DTL Seal inserted to a custodian for Storage for a predetermined time period. Notice for cases like Web Browsers running on any platform, underlying the device would not have the necessary secure Storage and secure processing apparatus to create cryptographic DTL Seal. In such cases, this invention realizes proxying such operations into a trusted backend system over standard secured communication protocols, including but not limited to TLS, VPN, etc.

The App is constructed to:
Determine and record the DTL of captured pictures and/or videos taken by the mobile devices.
Attach a digital seal indicating the DTL on captured pictures and/or videos (the "DTL Seal"). The DTL Seal is inserted in the digital captured pictures and/or videos.
Securely store captured pictures and/or videos comprising DTL Seals attached on a secure custodial server. A copy of captured pictures and/or videos comprising DTL Seals is also stored on the mobile device of the user, which can be accessed via the App.
Securely transmit a copy of files (e.g., captured pictures and/or videos, etc.) comprising DTL Seals to a user-designated counterparty via electronic means. Hard copies and other digitally stored versions of files, such as printed images and video frames, can also be forwarded to designated addresses.
A copy of one or more files (e.g., captured pictures and/or videos, etc.) comprising DTL Seals will be stored on a custodial server for a predetermined time period.
The user may request a copy of files (e.g., captured pictures and/or videos, etc.) comprising DTL Seals from the custodial server via electronic means.
Hard copies of files (e.g., captured pictures and/or videos, etc.) comprising DTL Seals can also be sent upon request.
The App can communicate with institutional systems such as SAP (SAP refers to business data software by SAP SE, which is a German multinational enterprise-software company).

The App will target any user who feels that the DTL of a file that he/she has captured should be independently verified for any reason. Furthermore, the need for verification can be instantaneous and/or continuous for a specified length of time. In this respect, the App will target both commercial and private users.

Following are some examples of files in which DTL Seals can be applied in commercial applications:

Insurance sector: Insurance agents, adjusters and policy holders frequently need to store images of insured and/or damaged property. The App can provide the DTL sealed images for such property as an independent third party and keep them as independent custodians.

Rent-a-car companies: The App can provide an easy and accurate state of the rented vehicle at the point of rental and return.

Courier services: The courier services frequently need to verify an actual delivery and a state of delivered items. The App can be especially useful and/or handy to verify the delivery of high value items.

Logistics: The logistics sector often desires to monitor and document the state of its facilities, the location of goods being handled, and/or the presence of various personnel at different processing and/or transportation points. The App offers a solution for documenting actions and statuses along with efficient data storage.

Custom inspections and brokerages: Inspectors and brokerages regularly record findings and/or activities. The App offers a highly practical utility to inspection and brokerage companies to oversee the activities of agents and representatives. Official institutions, such as Customs Administrations, also might have uses for the App.

Wholesale and retail trading sector: Wholesale and retail companies frequently monitor the state of facilities and activities of staff, such as various inspectors. The App can provide effective oversight to monitor the activities of this staff.

Consumer-to-Consumer or Business-to-Business Internet platforms: Various platforms which facilitate consumer-to-consumer or business-to-business trading, such as Ebay (Ebay is a registered trademark of eBay Inc. of San Jose, CA), Airbnb (Airbnb is a registered trademark of Airbnb, Inc. of San Francisco, CA), and various second-hand goods sale sites, frequently deal with disputes. The App can be used to prevent occurrence and/or settlement of such disputes. For example, second-hand clothing sites may require sellers to record the goods at the point of shipment and buyers to record the goods' state when they are being received and taken out of the box.

Luxury goods and jewelry stores: Such stores can record the state of merchandise that they sell and/or brought for servicing, such as repair, polishing, alteration, etc. The App can provide a third-party oversight and peace of mind for all the parties concerned.

Security firms: The App can be useful to supplement the staff of the security firms as well as provide efficient oversight of the staff.

Remote work verification: As many companies utilize remote work option for employees, verification of an actual location of a worker can be an important issue for various reasons, including tax and salary levels. The App can independently verify the DTL of the worker. Similarly, some work may require the worker be at a specific location at a specified time. This, too, can be verified by using the App.

Supply chain-related activities include monitoring a vendor's stocks at a particular location and subsequently triggering or holding shipment, triggering payments, replacing faulty stock, etc.

The above are just a few examples of commercial activities that the App can support.

As for private use, there are numerous possibilities. There could be many instances where independent certification of a particular image is desired and/or needed. Some examples are:

NFTs (non-fungible tokens). NFTs may be subject to IP protections, including copyright, design patent, and trademark rights. MomentProof technology could facilitate this. See: https://www.reuters.com/legal/legalindustry/demystifying-nfts-intellectual-property-what-you-need-know-2022-05-10/ sentimental reasons, such as recordation of a marriage proposal, birth of a child, attending a game, party, function, and/or witnessing a historical or personally important event, etc.;

proving one's presence at a particular event, such as being at a particular location and/or performing an activity;

recording an agreement;

monitoring various events and activities (maintenance and repairs, domestic workers, events of pleasant and unpleasant surprise);

recording damage and any items that may be subjected to a dispute, such as receipt of a damaged good;

recording an unusual event;

recording a delivery of a package from a courier (e.g., a user takes a photo of the delivery with the App—the App obtains GPS coordinates and inserts a DTL Seal, which securely attests of no tampering and proof that the delivery has taken place);

recording deliver of a valuable item (e.g., a diamond or watch) to a repair person;

recording images of a condition of an automobile prior to renting the automobile-certification provides assurance to the entity rending the car that a photo and/or video has not been altered, etc.;

recording images of someone taking a laboratory specimen (e.g., a drawing of blood for a pre-employment physical examination); and/or proving information delivery at the time information is taken-tamperproof-approval time and space fixed about an incident.

Captured files (e.g., pictures and/or videos, etc.) comprising DTL Seals Attestation can be stored indefinitely such that records can be available to future generations of a family.

FIG. 1 is a block diagram of an exemplary embodiment of a system 1000, which can comprise a smartphone 1300, an information device 1100, tablet 1200, a network 1400, a first server 1500, a second server 1600, a third server 1700, and a fourth server 1800. First server 1500 can comprise a first user interface 1520 and can be coupled to a first database 1540. Second server 1600 can comprise a second user interface 1620 and can be coupled to a second database 1640. Third server 1700 can comprise a third user interface 1720, a processor 1760, machine instructions 1780, and can be coupled to a third database 1740. Fourth server 1800 can comprise a fourth user interface 1820 and can be coupled to a fourth database 1840. Any of the methods and/or steps thereof can be carried out in whole or in part by tablet 1200, smartphone 1300, information device 1100 and/or first server 1500. Second server 1600, third server 1700, and/or fourth server 1800 can each be associated with implementation of a system via which rides are provided to customers. In certain exemplary embodiments, system 1000 can be used to implement one or more methods disclosed herein. The functionality of one ore more information devices and/or servers comprised by system 1000 is changed via the incorporation of hardware and/or software to implement the methods described herein.

Certification involves sending a verified file that comprises a DTL-S to a counter-party.

Figure 2:
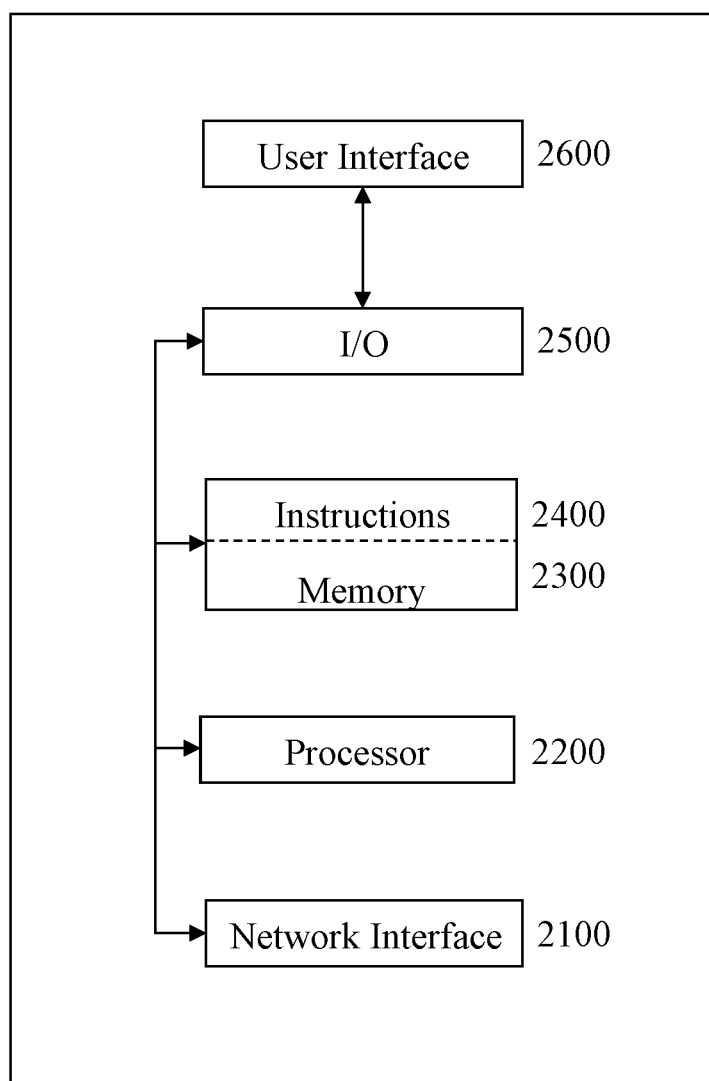
FIG. 2 is a block diagram of an exemplary embodiment of an information device 2000.

FIG. 2 is a block diagram of an exemplary embodiment of an information device 2000, which in certain operative embodiments can comprise, for example, first server 1500 and smartphone 1300, of FIG. 1. Information device 2000 can comprise any of numerous circuits and/or components, such as for example, one or more network interfaces 2100, one or more processors 2200, one or more memories 2300 containing instructions 2400, one or more input/output devices 2500, and/or one or more user interfaces 2600 coupled to one or more input/output devices 2500, etc.

In certain exemplary embodiments, via one or more user interfaces 2600, such as a graphical user interface, a user can view a rendering of information related to embedding DTL Seals in captured pictures and/or videos and the Storage and/or transmission thereof.

In certain exemplary embodiments, one or more memories 2300 can comprise a machine-readable medium comprising machine instructions for activities comprising:
  receiving a request to apply a DTL Seal to a file;
  inserting the DTL Seal in the File;
  copy the File comprising the DTL Seal to an information device of a user; and/or
  copy the File comprising the DTL Seal to a custodial memory device.

In certain exemplary embodiments, one or more processors 2200 can comprise a transform circuit, which comprises:
  a first circuit constructed to insert a DTL Seal in a file; and/or
  a second circuit to store the File comprising the DTL Seal in a custodial memory device.

Figure 3:
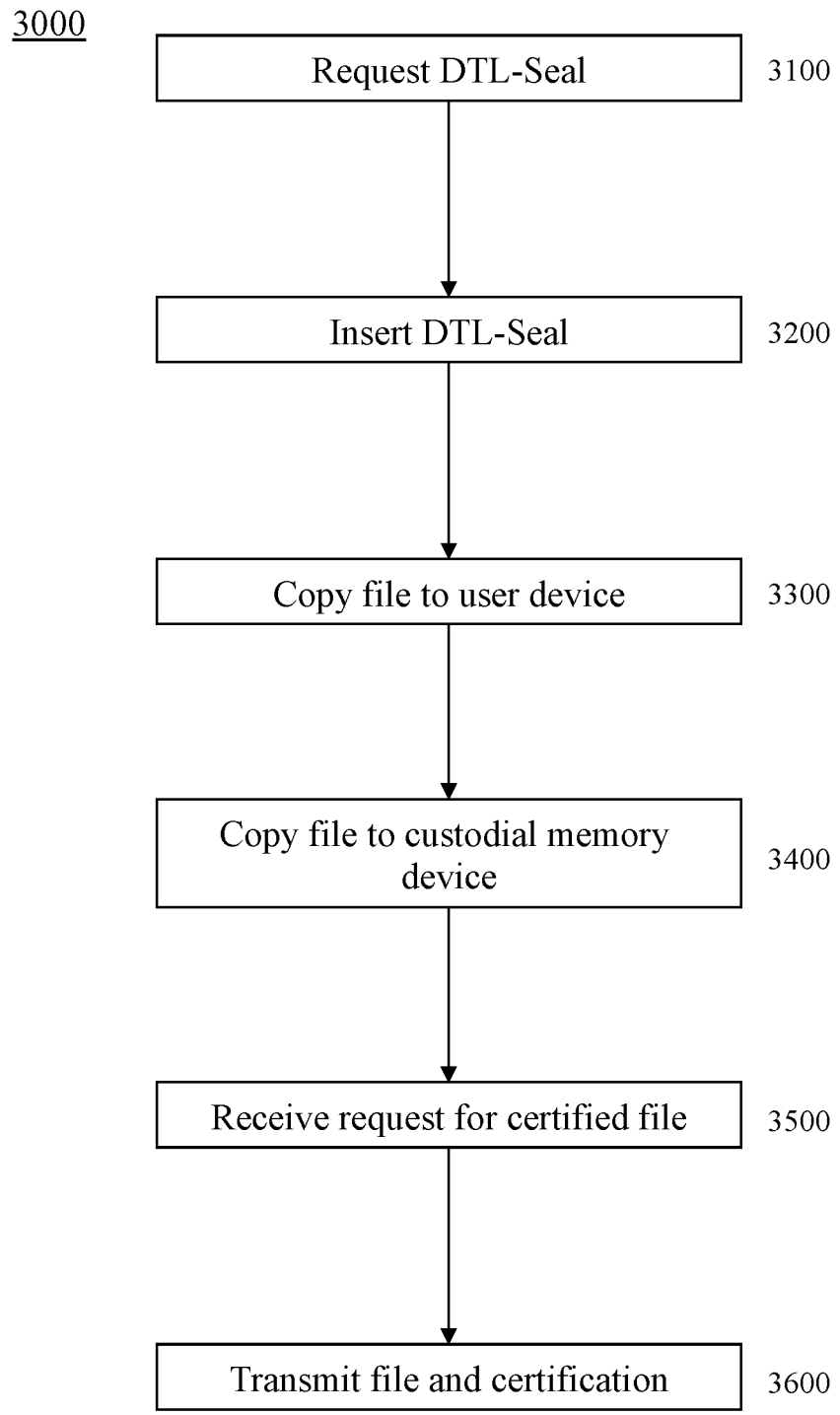
FIG. 3 is a flowchart of an exemplary embodiment of method 3000.

FIG. 3 is a flowchart of an exemplary embodiment of a method 3000. At activity 3100, a user can request that a DTL Seal be inserted in captured pictures and/or videos. The user can make the request via an App to a certifying entity. The certifying entity can receive the request to apply the DTL Seal to a file comprising a captured picture and/or video.

At activity 3200, the DTL Seal can be inserted in captured pictures and/or videos. The App and/or the certifying entity can insert the DTL Seal in the File.

At activity 3300, a copy of captured pictures and/or videos comprising DTL Seals can be stored on a mobile device of the user. The App and/or the certifying entity can cause a first copy of the File comprising the DTL seal to be stored on an information device of the user.

At activity 3400, a copy of captured pictures and/or videos comprising DTL Seals can be stored on a custodial server for a predetermined time period. The App and/or the certifying entity can cause a second copy of the File comprising the DTL seal to be stored on a custodial memory device.

At activity 3500, a request can be received of a certified file. The App and/or the certifying entity can receive the request for certification of the File comprising the DTL Seal.

At activity 3600, a certification and/or the certified File can be transmitted. The App and/or the certifying entity can transmit the certification of the File comprising the DTL Seal. In certain exemplary embodiments the File comprising the DTL Seal can be transmitted with the certification.

Definitions

When the following terms are used substantively herein, the accompanying definitions apply. These terms and definitions are presented without prejudice, and, consistent with the Application, the right to redefine these terms during the prosecution of this Application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapted to—made suitable or fit for a specific use or situation.
agent—a user of the App that uses the App on behalf of an institutional user.
AMD—Advanced Micro Devices, Inc. is an American multinational semiconductor company based in Santa Clara, California, that develops computer processors and related technologies.
and/or—either in conjunction with or in alternative to.
App—the mobile Application specified herein, which has been placed on a mobile device.
apparatus—an appliance or device for a particular purpose.
apply—to embed in a file.
ARM—a family of reduced instruction set computer ("RISC") instruction set architectures for computer processors, configured for various environments. Arm Ltd. (of Cambridge England) develops the architectures and licenses them to other companies, who design their own products that implement one or more of those architectures, including system on a chip (SoC) and system on module (SOM) designs.
associate—to join, connect together, and/or relate.
automatically—acting or operating in a manner essentially independent of external influence or control. For example, an automatic light switch can turn on upon "seeing" a person in its view, without the person manually operating the light switch.
Bluetooth—a wireless technology standard for exchanging data over short distances (using short-wavelength UHF radio waves in the ISM band from 2.4 to 2.485 GHz) from fixed and mobile devices, and building personal area networks.
can—is capable of, in at least some embodiments.
cause—to produce an effect.
certification—a document (physical or electronic) provided by a custodial entity that verifies correctness of content of date, time, and location of information in a file.
circuit—an electrically conductive pathway and/or a communications connection established across two or more switching devices comprised by a network and between corresponding end systems connected to, but not comprised by the network.
Company—an institution that acts as a repository for data.
comprising—including but not limited to.
configure—to make suitable or fit for a specific use or situation.
convert—to transform, adapt, and/or change.
copy—a substantially identical reproduction of something.
counter party(ies)—any party (real person or institution) that a user requests the DTL sealed image be sent to by the App. In case of an image taken by the Agent of an institution, institution itself becomes one of the counterparties.

create—to bring into being.

custodial—operated and controlled by an entity entrusted with guarding or maintaining specific data files.

data—distinct pieces of information, usually formatted in a special or predetermined way and/or organized to express concepts.

define—to establish the outline, form, or structure of.

determine—to obtain, calculate, decide, deduce, and/or ascertain.

device—a machine, manufacture, and/or collection thereof.

DTL—a date, time, and location of an image taken by the mobile device of a User/Agent by using the App.

DTL Seal—a cryptographic operation via which a DTL imprint is embedded into an image or video file taken by a user and/or agent. Concurrently with imprinting a DTL Seal into an image or video file, the imprinted into an image or video file is transmitted and stored by a third party certifier of DTL seals.

embed—to place in something else.

estimate—to calculate and/or determine approximately and/or tentatively.

File—a particular collection of data (such as an image or a video) treated by an information device as a unit.

generate—to create, produce, give rise to, and/or bring into existence.

Global Positioning System ("GPS")—a system adaptable to determine a terrestrial location of a device receiving signals from multiple satellites.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hash—a function that can be used to map data of arbitrary size to fixed-size values.

ID—a group of symbols that are unique to a particular device, activity, and/or document, etc.

image refers to a digital photo and/or video captured by the User or the Agent with his/her mobile device through the App.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/ or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

insert—to constructively place in something.

institutional user—an institution which uses Moment-proof third party verification services.

Intel—a technology company presently headquartered in Santa Clara, CA.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile Memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

mobile device—a portable information device constructed to be carried on the person of a user. Examples of mobile devices are cellular phones and tablets.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

packet—a discrete instance of communication.

plurality—the state of being plural and/or more than one.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, California. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

receive—to get as a signal, take, acquire, and/or obtain.

recommend—to suggest, praise, commend, and/or endorse.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

RISC—a reduced instruction set computer ("RISC") is a computer designed to simplify the individual instructions given to the computer in order to realize a task.

select—to make a choice or selection from alternatives.

sensor—a device used to measure a physical parameter (e.g., location, temperature, pressure, capacitance, and/or loudness, etc.) and convert that physical quantity into a signal of some kind (e.g., voltage, current, power, etc.).

server/custodian—servers and/or storage facilities where DTL sealed images kept and forwarded to the counterparty(ies) upon request.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

transmit—to send as a signal, provide, furnish, and/or supply.

TPM—a trusted platform module ("Trusted Platform Module"), also known as ISO/IEC 11889, is an international standard for a secure cryptoprocessor, a dedicated microcontroller designed to secure hardware through integrated cryptographic keys.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user—a person who operates an App on his/her mobile device.

VDTL-S—a Virtual DTL-S that comprises timestamp and location parameters taken from a virtual world trusted location server and a virtual world trusted time server.

Verification Certificate—a written document provided by a company certifying an image and a DTL seal upon request by a user whether individual or institutional within the period of Verification Maturity.

Verification Maturity—a user specified (whether individual or institutional) length of a period DTL sealed images are stored by the Company.

via—by way of and/or utilizing.

weight—a value indicative of importance.

Wi-Fi—pertaining to a network that utilizes one of a family of wireless network protocols, based on the IEEE 802.11 family of standards, which can be used for local area networking of devices and Internet access.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this Application.

Thus, regardless of the content of any portion (e.g., title, field, background, summary, description, abstract, drawing figure, etc.) of this Application, unless clearly specified to the contrary, such as via explicit definition, assertion, or argument, with respect to any claim, whether of this Application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this Application, other than the claims themselves, is to be regarded as illustrative in nature, and not as restrictive.

What is claimed is:

1. A method comprising:
receiving a first request to apply a DTL Seal to a file;
automatically inserting the DTL Seal in the File;
automatically storing a first copy of the File comprising the DTL seal to an information device of a user; and
automatically storing a second copy of the File comprising the DTL seal to a custodial memory device.

2. The method of claim 1, further comprising:
receiving a second request for certification of the File comprising the DTL Seal; and
automatically transmitting the certification of the File comprising the DTL Seal.

3. The method of claim 1, further comprising:
receiving a second request for certification of the File comprising the DTL Seal;
automatically transmitting the certification of the File comprising the DTL Seal; and
automatically transmitting a copy of the File comprising the DTL Seal with the certification.

4. A machine-readable medium comprising machine instructions for activities comprising:
receiving a request to apply a DTL Seal to a file, the File obtained from a virtual reality, virtual world, or augmented reality application;
automatically inserting the DTL Seal in the File;
automatically copying the File comprising the DTL Seal to an information device of a user; and
automatically copying the File comprising the DTL Seal to a custodial memory device.

5. The machine-readable medium of claim 4, wherein:
the DTL Seal comprises a VDTL-S.

6. A transform circuit comprising:
a first circuit constructed to insert a DTL Seal in a file, wherein:
   a device comprising the first circuit is accepted to a DTL-S trusted member set;
   the device is verified via detection of a particular software version;
   the device is verified via detection of a sensor operating in a trustworthy manner; and
a second circuit to store the File comprising the DTL Seal in a custodial memory device.

7. The transform circuit of claim 6, wherein:
the sensor is a GPS sensor.

\* \* \* \* \*